(12) United States Patent
Maloisel et al.

(10) Patent No.: US 7,067,059 B2
(45) Date of Patent: Jun. 27, 2006

(54) GENERATION OF ION EXCHANGER MEDIA

(75) Inventors: Jean-Luc Maloisel, Uppsala (SE); Nicolas Thevenin, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 226 days.

(21) Appl. No.: 10/489,468

(22) PCT Filed: Sep. 12, 2002

(86) PCT No.: PCT/SE02/01650

§ 371 (c)(1),
(2), (4) Date: Mar. 10, 2004

(87) PCT Pub. No.: WO03/024588

PCT Pub. Date: Mar. 27, 2003

(65) Prior Publication Data

US 2004/0238446 A1    Dec. 2, 2004

(30) Foreign Application Priority Data

Sep. 14, 2001    (SE) .................................. 0103084

(51) Int. Cl.
*B01D 15/08*    (2006.01)

(52) U.S. Cl. .................. 210/635; 210/656; 210/198.2; 210/502.1; 502/401; 502/439; 521/32; 521/33

(58) Field of Classification Search ............... 210/635, 210/656, 659, 679, 198.2, 502.1; 502/401, 502/402, 439; 521/32, 33

See application file for complete search history.

(56) References Cited

U.S. PATENT DOCUMENTS

| | | | | |
|---|---|---|---|---|
| 5,652,348 | A * | 7/1997 | Burton et al. ................. | 536/20 |
| 5,789,578 | A * | 8/1998 | Burton et al. ................. | 536/56 |
| 6,090,288 | A * | 7/2000 | Berglund et al. ........... | 210/635 |
| 6,702,943 | B1 * | 3/2004 | Johansson et al. .......... | 210/635 |
| 2004/0168983 | A1 * | 9/2004 | Andersson et al. ......... | 210/656 |

FOREIGN PATENT DOCUMENTS

| | | |
|---|---|---|
| EP | 1 123 942 A2 | 8/2001 |
| WO | WO99/38842 | 8/1999 |
| WO | WO99/65607 | 12/1999 |

* cited by examiner

Primary Examiner—Ernest G. Therkorn
(74) Attorney, Agent, or Firm—Yonggang Ji

(57) ABSTRACT

The present invention relates to a method of generating a separation medium comprising mixed mode cation-exchanger ligands coupled to a base matrix, which method comprises to provide a scaffold comprising a functional group and exhibiting a cyclic core structure; derivatise the scaffold with a reagent comprising a reactive group coupled to a residue R by reacting the functional group of the scaffold with said reactive group; open the cyclic structure of the resulting derivative; and react the product with a base matrix comprising a reactive group. The scaffold presents at least two functionalities; one sulphur-comprising group for coupling to the base matrix and one group that can be transformed into an ionic group.

11 Claims, 3 Drawing Sheets

New multimodal cation exchanger media

Example of synthesis of multimodal cation exchanger media via the homocysteine thiolactone

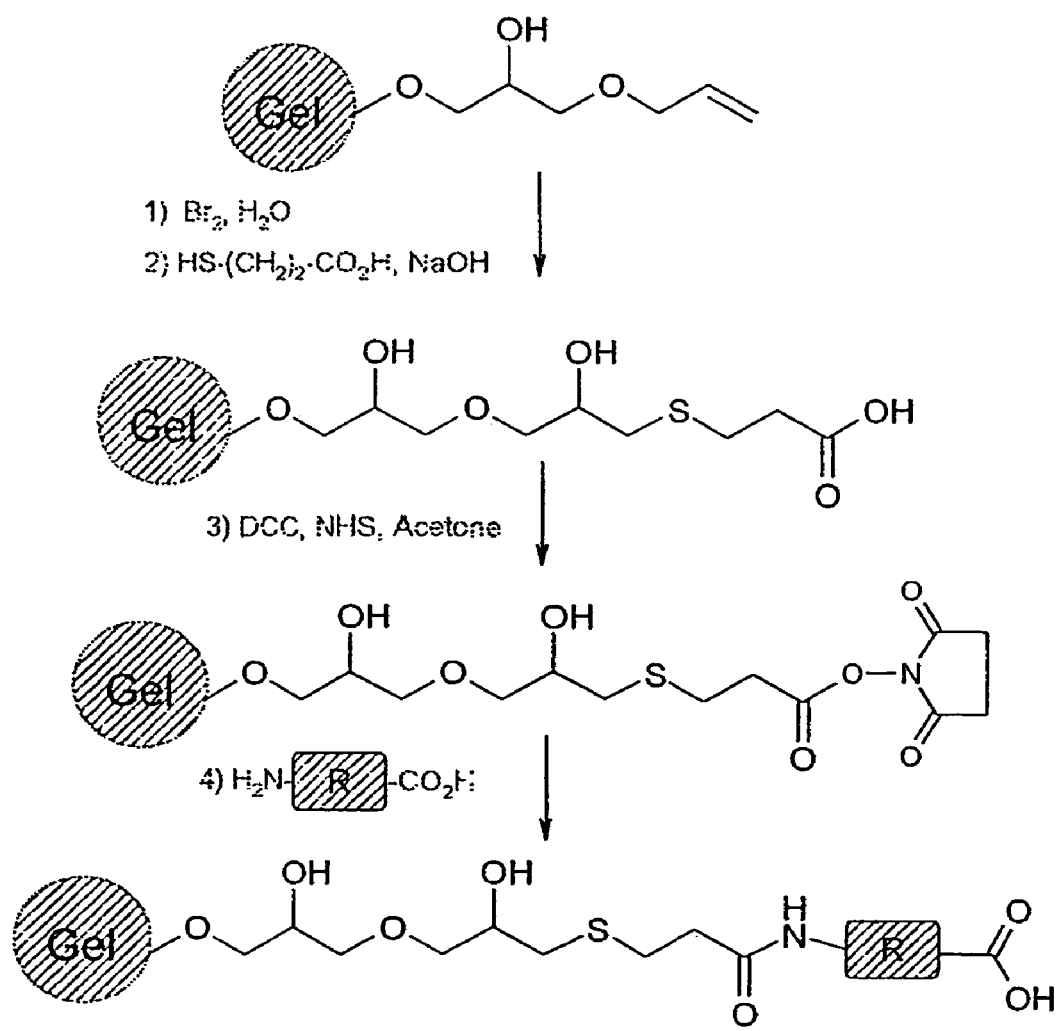
Figure 1: Example of a traditional synthesis of multimodal cation exchanger media

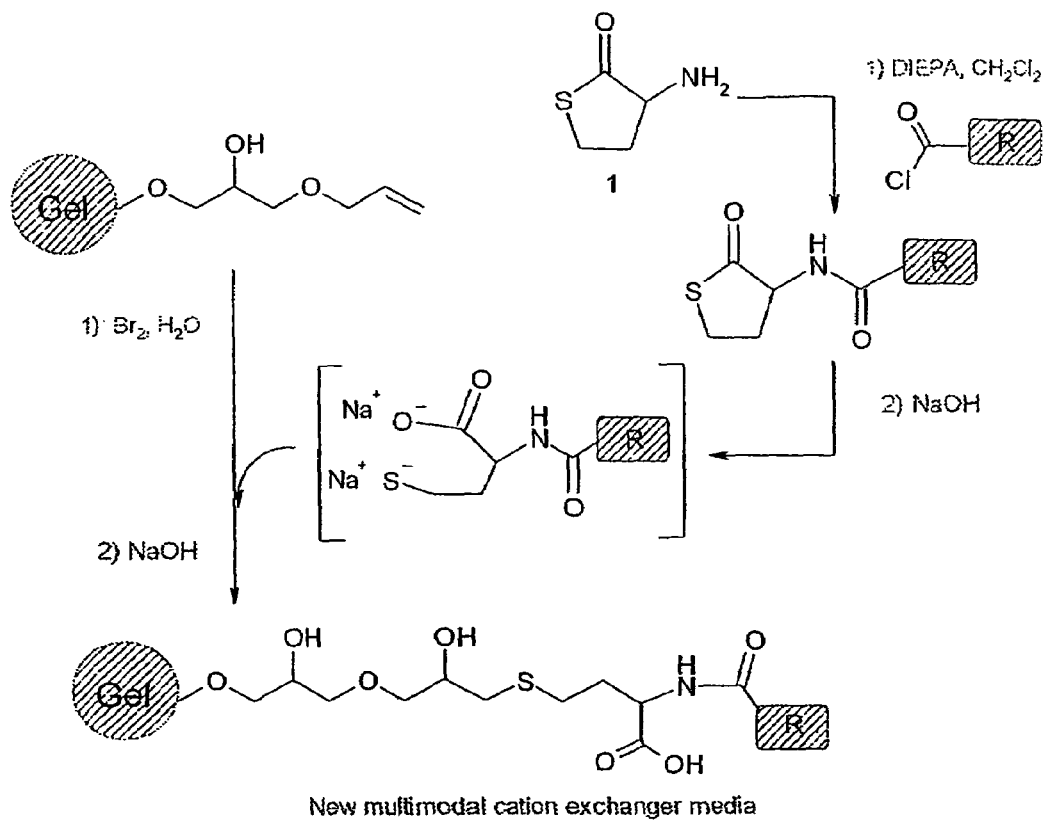
Figure 2: Example of synthesis of multimodal cation exchanger media via the homocysteine thiolactone
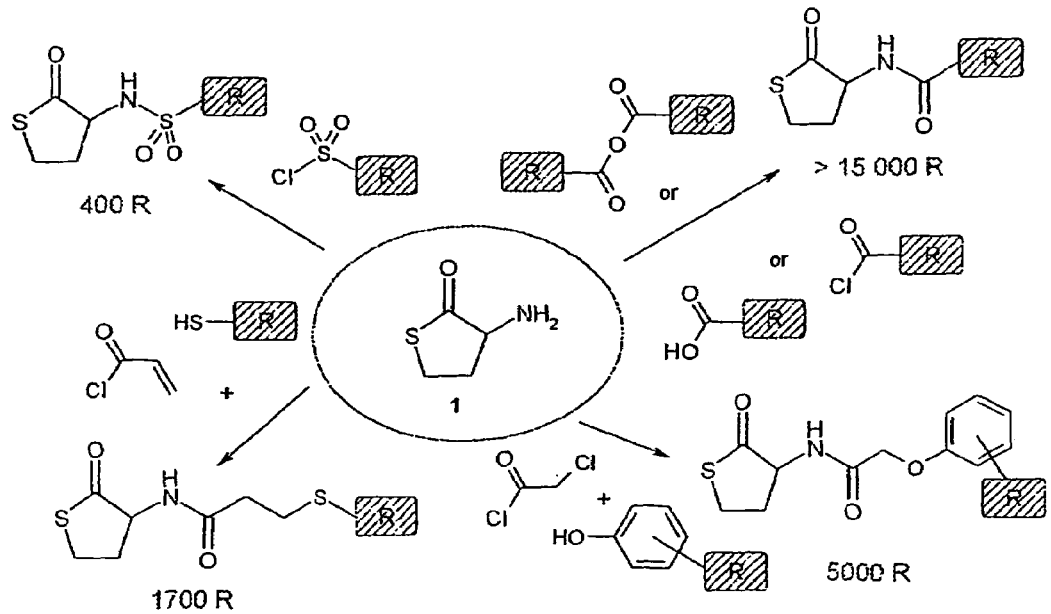
Figure 3: Examples of potential diversity of libraries of multimodal cation exchanger media via the homocysteine thiolactone

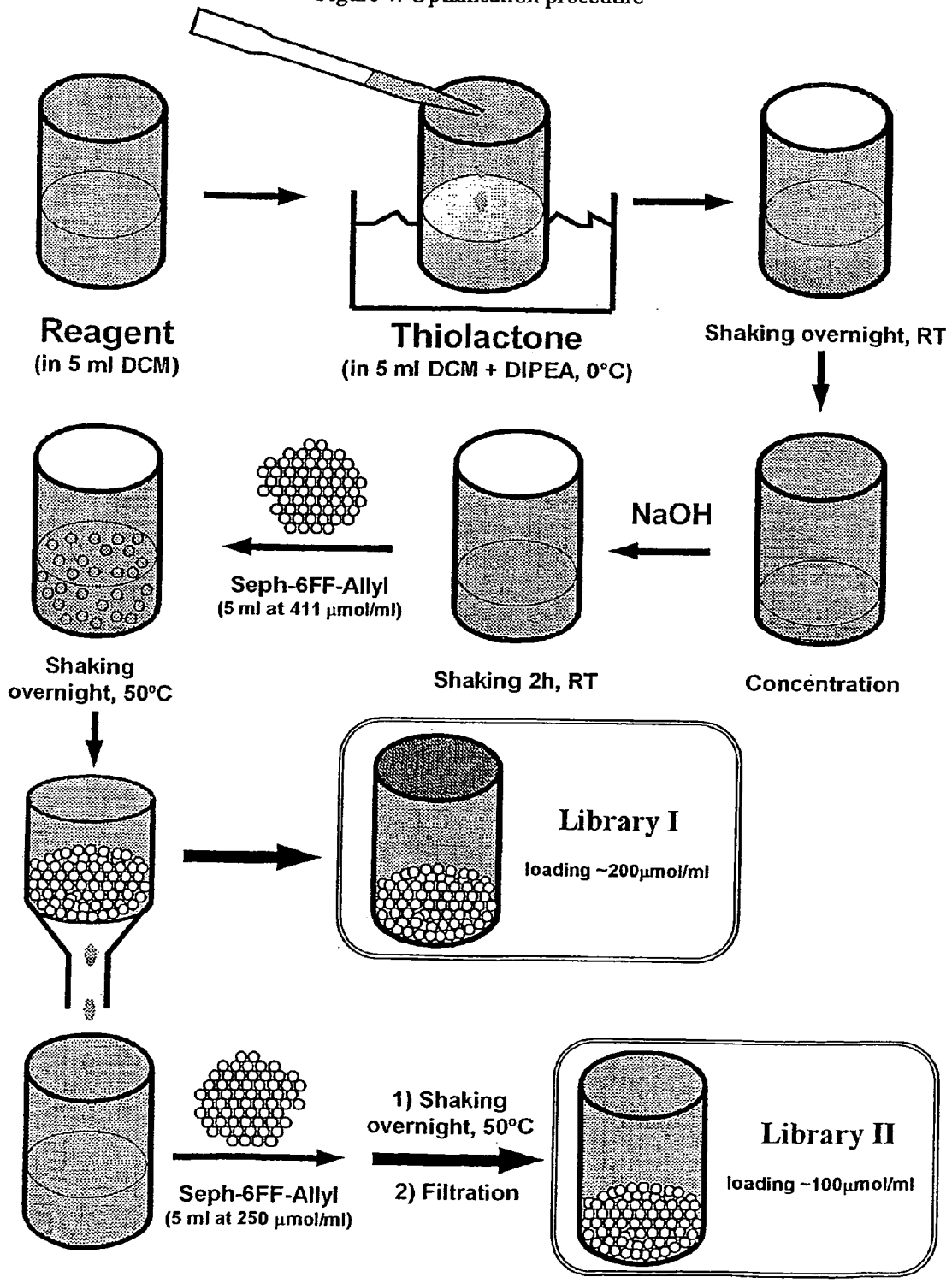
Figure 4: Optimisation procedure

GENERATION OF ION EXCHANGER MEDIA

CROSS REFERENCE TO RELATED APPLICATIONS

This application is a filing under 35 U.S.C. § 371 and claims priority to international patent application number PCT/SE02/01650 filed Sep. 12, 2002, published on Mar. 27, 2003 as WO03/024588, and to foreign application number 0103084-0 filed in Sweden on Sep. 14, 2001, the entire disclosures of which are hereby incorporated by reference.

TECHNICAL FIELD

The present invention relates to the field of separation and especially separation by ion exchange using mixed mode cation-exchanger ligands. More specifically, the invention relates to a method of generating a mixed mode cation-exchanger medium, and also to a kit, which comprises essential starting material(s) for such generation.

BACKGROUND

The term chromatography embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions (partitions) many times before the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in the order of increasing interaction with the stationary phase. The least retarded component elutes first, the most strongly retained material elutes last. Separation is obtained when one component is retarded sufficiently to prevent overlap with the zone of an adjacent solute as sample components elute from the column.

The column is the heart of the chromatograph and provides versatility in the type of instrument that can be obtained by a single instrument. Especially, large efforts are continuously being made to design the optimal stationary phase for each specific purpose. Such a stationary phase is usually comprised of a support or base matrix to which a ligand comprising functional i.e. binding groups has been attached. As is easily realised, the selection of possible ligands is vast but for an overview a number of different classes of ligands will be given below.

In affinity adsorption, serine proteases have been adsorbed/desorbed to/from matrices to which p-aminobenzamidine has been covalently linked via the para amino group.

Mixed mode anion-exchangers have been disclosed e.g. in WO 9729825 (Amersham Pharmacia Biotech AB), providing interactions based on charges and hydrogen-bonding involving oxygen and amino nitrogen on 2–3 carbons' distance from positively charged amine nitrogen. The publication is based on the discovery that this kind of ligands can give anion-exchangers that require relatively high ionic strengths for eluting bound substances.

Cation-exchangers in which there are mixed mode ligands that require relatively high ionic strengths for eluting bound substances have been suggested in WO 9965607 (Amersham Pharmacia Biotech AB). Furthermore, WO 9729825 (U.S. Pat. No. 6,090,288) and WO 9965607 describe anion and cation-exchange ligands that both require relatively high elution ionic strength.

Separation media of the general structure M-SP1-L, wherein M is a support matrix that may be hydrophilic, SP1 is a spacer and L comprises a mono- or bicyclic homoaromatic or heteroaromatic moiety that may be substituted (a homoaromatic moiety comprises an aromatic ring formed only by carbon atoms) are disclosed in WO 9808603 (Upfront Chromatography). The substituents are primarily acidic. The separation medium is suggested for the adsorption of proteins, in particular immunoglobulins, by hydrophobic interactions rather than ion exchange. WO 9600735, WO 9609116 and U.S. Pat. No. 5,652,348 (Burton et al) also disclose separation media that are based on hydrophobic interaction. Adsorption and desorption are supported by increasing or decreasing, respectively, the salt concentration of the liquid or changing the charge on the ligand and/or the substance to be adsorbed/desorbed by changing pH. The ligands typically comprise a hydrophobic part that may comprise aromatic structure. Some of the ligands may in addition also contain a chargeable structure for permitting alteration of the hydrophobic/hydrophilic balance of the media by a pH change. The chargeable structure may be an amine group.

Finally, U.S. Pat. No. 5,789,578 (Burton et al) suggests to immobilise a thiol containing ligand, such as 3-mercaptopropionic acid, glutathione etc, by addition of the thiol group over carbon-carbon double bond attached to a support matrix.

However, once the structure of the desired ligand has been decided, further important considerations will reside in the choice of a suitable method of preparation thereof.

For example, recently a novel type of ligands denoted high salt ligands has been disclosed, see e.g. WO 0011605 (Amersham Pharmacia Biotech AB, Uppsala, Sweden). Since these ligands can function as mixed mode cation-exchanger ligands, they have shown to be of great interest in many industrial applications, such as protein purification, since they can withstand high salt concentrations and accordingly does not require any substantial dilution of the sample. Thus, the high salt ligands are advantageously used for separations, since they reduce the total volume of sample required as compared to previously described methods, and accordingly reduce the total cost for equipment as well as work effort required in such applications.

However, even though the mixed mode cation-exchanger ligands reduce costs and efforts when used in separation, the hitherto described methods of preparation thereof includes drawbacks that have made them less advantageous in practice. In general terms and to obtain a good diversity, the preparation of such ligand would include four steps, namely
 (i) Introduction of a reactive group on a chromatographic support and its optionally activation thereof;
 (ii) Reacting the resulting modified support with a thiol compound containing an acid function.
 (iii) Activation of the acidic functions of the solid support with a suitable reagent (ex. NHS in presence of DCC) in an organic solvent.
 (iv) Addition of an amino acid derivative comprising a suitable residue R to produce a finished ligand attached to a support.

One problem with the sequence of steps disclosed above is that it will result in a product which in fact contains two different ligands, namely the thio ether linker containing an acid function, resulting from unsuccessful conversions in step (iii) or (iv) and the desired end product. A chromatographic support composed of a mixture of two such different ligands can cause several problems when used in a separation procedure. For example, the analysis will become difficult, resulting in less robust methods of preparation and use than what is generally needed. For the same reason, if the media is obtained as a mixture of two ligands, it will become difficult to optimise the preparation and the use of such chromatographic support for each specific application. Furthermore, such a mixture will inherently result in a less specific separation than a better-defined medium.

Furthermore, another problem involved in the conventional method described above is the fact that the large chromatographic support molecule will be present in the procedure from step (i). Put differently, the whole procedure will need to be performed in large volumes, requiring very specific large-scale equipment and entailing the substantial costs that are inherent in working in such type equipment.

Yet another drawback with the prior art method disclosed above is the fact that all steps are performed on solid support. The use of the above-discussed large specific equipment will also include additional disadvantages related to more time-consuming and complicated washing routines. This is especially true for steps (ii) to (iii) and (iii) to (iv), where you go from an aqueous to an organic solvent and vice versa.

Since at present there are no functional alternatives to the method described above available, there is a need within this field of improved methods for the manufacture of mixed mode cation-exchanger ligands for use in separation procedures.

SUMMARY OF THE INVENTION

Accordingly, one object of the present invention is to provide a method of producing a separation medium comprising mixed mode cation-exchanger ligands, wherein the composition of the ligands obtained is easy to control. This object can be achieved by using as starting material a novel scaffold or scaffold derivative as described in the appended claims.

Another object of the invention is to provide a method of producing a separation medium comprising mixed mode cation-exchanger ligands, which method is simplified and less costly than the previously described method. This object can be achieved by a method wherein the solid support or gel comprising reagent is not introduced in the process until the last step, as described in the appended claims, whereby the previously required large volumes of reagents can be avoided. This object is also achieved by a method that in total requires fewer steps than the previously disclosed method, as disclosed in the appended claims.

A further object of the invention is to provide a method of producing a separation medium comprising mixed mode cation-exchanger ligands, which method constitutes a more environmentally acceptable alternative than the previously described method. This object can be achieved by a method as described in the appended claims, which method requires less solvent than the prior art methods. Also, the above discussed feature that the method according to the invention in total can be performed in smaller volumes will also contribute to a more environmentally advantageous alternative, since smaller volumes will require less washing liquids and are also less energy consuming.

Further objects and advantages of the present invention will appear from the detailed description below.

DEFINITIONS

The terms "carrying a negative charge" and "negatively charged" mean that the substance carries one or more negative charges and/or has a negative net charge.

The terms "mixed mode cation exchanger ligand" and "multimodal cation exchanger ligand", in the context of this invention, refer to a ligand that is capable of providing at least two different, but co-operative, sites which interact with the substance to be bound. One of these sites gives an attractive type of charge-charge interaction between the ligand and the substance of interest. The second site typically gives electron acceptor-donor interaction and/or hydrophobic and/or hydrophilic interactions. Electron donor-acceptor interactions include interactions such as hydrogen-bonding, $\pi$—$\pi$, charge transfer, dipole-dipole, induced dipole etc.

The term "medium" (in plural media) comprises a ligand i.e. a binding group coupled to a base matrix, i.e. a support for use in chromatography. The term as used herein does not include any liquids.

The term "high salt" ligand refers to a ligand that is capable of binding proteins in the presence of relatively high concentrations of salt (e.g. 0.3 M NaCl) relative to a reference ion exchanger that is operated under identical conditions.

This can be determined using a method of frontal analysis, as described below in the experimental part.

"Electron donor-acceptor interactions" mean that an electronegative atom with a free pair of electrons acts as a donor and bind to an electron-deficient atom that acts as an acceptor for the electron pair of the donor. (See e.g. Karger et al., An Introduction into Separation Science, John Wiley & Sons (1973) page 42.)

Typical acceptor atoms/groups are electron deficient atoms or groups, such as metal ions, cyano, nitrogen in nitro etc, and include a hydrogen bound to an electronegative atom such as HO— in hydroxy and carboxy, —NH— in amides and amines, HS— in thiol etc.

By cation-exchanger is contemplated that the substance to be removed carries a positive charge and the cation-exchanger is negatively charged (=cation-exchanger conditions). For an amphoteric substance that is present in an aqueous liquid this means a $pH \leq pI+0.5$, preferably $pH \leq pI$.

BRIEF DESCRIPTION OF THE DRAWINGS

FIG. 1 shows an example of a traditional synthesis of multimodal cation exchanger media as discussed in general terms in the section "Background" above.

FIG. 2 shows one embodiment of the present invention for synthesis of multimodal cation exchanger media using homocysteine thiolactone as a scaffold.

FIG. 3 illustrates the example of the potential diversity of libraries of multi-modal cation exchanger media via the exemplary scaffold homocysteine thio-lactone.

FIG. 4 illustrates in a schematic way the general procedure to synthesise different libraries of media from the same set of reactive solutions.

DETAILED DESCRIPTION OF THE INVENTION

A first aspect of the present invention is a method of generating a separation medium comprising mixed mode cation-exchanger ligands coupled to a base matrix, which method comprises the steps of (a) providing at least one scaffold, each one of which comprises a functional group F and exhibits a cyclic core structure;
(b) derivatization of the scaffold(s) with a reagent comprising a reactive group coupled to a residue R by reacting the group F of said scaffold with the reactive group of said reagent, while retaining the cyclic structure of the scaffold;
(c) opening up of the cyclic structure of the resulting derivative; and
(d) reacting the opened product so obtained with a base matrix comprising a
reactive group, which is optionally coupled to the base matrix via a spacer;

wherein said scaffold presents at least two functionalities, one of which is a sulphur-comprising group for coupling to the reactive group of the base matrix and one of which is a group that can be transformed into an ionic group, said functionalities being present on the cyclic structure in adjacent positions, and wherein in step (c), opening up is provided by breaking the bond between two functionalities. The hydrolysis according to step (c) can e.g. be performed by addition of a base or any other suitable method. The function of the sulphur-comprising group is to provide an easy and stable attachment point to the chromatographic support. Given the high nucleophilicity of e.g. an S—H group high efficiency is obtained in the coupling via a nucleophilic substitution or via a radical addition.

In one embodiment, the opening up of the cyclic structure according to step (c) is achieved by hydrolysis, such as by addition of sodium hydroxide, as exemplified under A of the experimental part below. In an alternative embodiment, said opening is achieved by adding a nucleophilic agent, such as by adding an amino acid or an amine, as exemplified under B of the experimental part below. However, to open up the cyclic structure, any compound can be added that brings about a nucleophilic substitution reaction. The only requirement is that the ring opening results in one group that can be transformed into an ionic group and one thiol group, which thiol group is subsequently available for coupling to a gel and/or a spacer.

More specifically, in one embodiment of the present method, the scaffold is defined by the general formula (I)

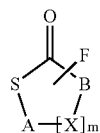

(I)

wherein A, B and X irrespective of each other are sp²- or sp³-hybridised carbon atoms or any heteroatom, such as oxygen, sulphur, nitrogen and/or silica. In a simple embodiment, A, B and X are all carbon atoms. m is any integer between 0 and 4, such as 1–3, preferably 1 or 2, and for many applications 1. As the skilled in this field realises, the number m will have an impact of the length of the ligand in the final separation medium. It will therefore be decided depending e.g. on selected active groups on the mixed mode cation-exchanger ligands, the intended separation, whether or not a spacer is included between the base matrix and the reactive group thereon etc. The functional group F is represented either by one X i.e. as an integral part of the cyclic structure, or appears coupled to any one of A, B and X possibly via a linker. Such a linker can depending on the desired properties of the final separation medium be comprised of 1–50, the main consideration of which being that it should not cause any undesired side-effects in the present method for generating a separation medium. The desired properties of the linker are largely corresponding to those of the spacer between base matrix and reactive group.

More specifically, the above mentioned spacer as such is conventional as in traditional ion exchangers and may thus comprise linear, branched, cyclic saturated, unsaturated and aromatic hydrocarbon groups (e.g. with up to 1–20, such as 1–10 carbon atoms). Said groups may carry hydroxy groups, halogens, alkoxy and aryloxy and the corresponding thio analogues, and/or amino groups. Carbon chains may at one or more positions be interrupted by amino nitrogen for certain applications, ether oxygen, thioether sulphur etc. There may also be carbonyl groups, such as in amides and ketones, and other groups having the comparable stability against hydrolysis. At most one atom selected from oxygen, sulphur and nitrogen is preferably bound to one and the same $sp^1$-hybridised carbon atom. Further, the spacer may provide one or more electron donor or acceptor atoms or groups enhancing binding of the substance to the cation-exchanger as discussed above, for instance by participating in hydrogen-bonding, π-interaction, hydrophobic or hydrophilic interactions etc.

Thus, the method according to the present invention comprises fewer steps than the previous method, and will therefore save time and consequently costs when worked. Furthermore, since the base matrix, which is advantageous a gel is not introduced in the process until the last step, great savings are also made by limiting the previously required lengthy washing procedures.

In one embodiment of the method according to the present invention, in formula (I), the functional group F is selected from a group that contains a leaving group as conventionally used in nucleophilic substitution, such as C—Y wherein Y represents for example Br, Cl, I, mesylate, or a tosylate group; an acid or an activated acid such as WC=O, wherein W is for example formed from N-hydrosuccinimide, pentafluorophenol, para-nitrophenol or isopropyl chloro-formate; a nucleophilic group such as for example —OH, —SH or —NH₂ ; and a C=C.

In an advantageous embodiment of the method, in formula (I), A, B, and X are carbon atoms, m is 1 and F is —NH₂.

In an especially advantageous embodiment, the scaffold used is homocysteine thiolactone, which is an easily available commercial product (e.g. from Aldrich or any other well-known supplier of laboratory chemicals).

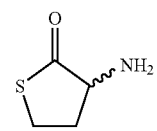

This embodiment is at present the best mode of carrying out the present invention. In the experimental part of the present application, the racemic mixture of the scaffold has been used. However, as the skilled in this field will realise, for certain applications, it may be more advantageous to use either the D or the L form, or a mixture comprising specified proportions thereof. The most suitable form is easily tested in routine experiments.

In one embodiment of the method according to the invention, the derivatization agent used in step (b) is described by the general formula

wherein

Z constitutes the reactive group the function of which is to react with the functional group F of the scaffold. Thus, for each embodiment, the nature of Z is selected to be reactive with the F as discussed above; and R can comprise linear, branched, cyclic saturated, unsaturated and aromatic hydrocarbon groups (e.g. with up to 1–20, such as 1–10 carbon atoms). Such groups may carry hydroxy groups, halogens, alkoxy and aryloxy and the corresponding thio analogues, and/or amino groups. Carbon chains may at one or more positions be interrupted by amino nitrogen for certain applications, ether oxygen, thioether sulphur etc. There may also be carbonyl groups, such as in amides and ketones, and other groups having the comparable stability against hydrolysis. At most one atom selected from oxygen, sulphur and nitrogen is preferably bound to one and the same $sp^3$-hybridised carbon atom. Further, R will provide one or more electron donor or acceptor atoms or groups to enable binding of a substance to the cation-exchanger as discussed above. R can as well contain charged groups as long as the final ligand presents a full interval window where it is globally negatively charged and can function as a cation-exchanger.

Thus, since the final separation medium is useful in ion exchange mode, the residue R is used to introduce the multimodal characteristics thereof, as desired. As the skilled reader will realise, the final medium can comprise ligands wherein R is comprised of two or more parts that are functional in binding separated by the above discussed spacers.

The present invention also encompasses the products of the method according to the invention, i.e. mixed mode cation-exchanger ligands, such as high salt ligands. The ligands according to the invention can be produced as much more homogenous compounds than the results of prior art methods. Specific examples encompassed by the invention are as disclosed in the tables in the experimental part below.

In one embodiment of the method according to the present invention, the method also includes a step of bromination separately and before step (b) the reactive group of the base matrix, wherein said reactive group comprises a carbon-carbon double bond. Such bromination is well known in this field.

In an alternative embodiment, the present method instead includes a step of activating separately and before step (b) the reactive group of the base matrix under conditions favouring a radical reaction, wherein said reactive group comprises a carbon-carbon double bond. A radical reaction can be initiated by any well known method, e.g. by addition of chemicals that initiates a reaction, known as radical initiators, by use of light, such as UV etc. This sort of reactions and the conditions therefore are well known in this field and have been extensively discussed in the literature.

However, as the skilled in this field will realise, the only criteria that limit the reactive group present on the base matrix is that it should be able to react to a sufficient extent with one of the ends resulting from the opening up of the scaffold's ring structure. Furthermore, it should also be essentially unreactive with the rest of the opened up scaffold derivative in order not to destroying any structure that is needed on the final separation medium. Accordingly, the choice of one of the functionalities of the scaffold and the choice of the reactive group present on the base matrix should be made so that they can react with each other. Also, even if it is not the simplest embodiment, it is also understood that the reactive groups on the base matrix can be identical or different.

As regards the base matrix, it is based on organic or inorganic material, or a combination thereof, such as a Strearline-type of combined materials (Amersham Pharmacia Biotech AB, Uppsala, Sweden). The base matrix is preferably hydrophilic and in the form of a polymer, which is insoluble and more or less swellable in water. Hydrophobic polymers that have been derivatized to become hydrophilic are included in this definition. Suitable polymers are polyhydroxy polymers, e.g. based on polysaccharides, such as agarose, dextran, cellulose, starch, pullulan, etc. and completely synthetic polymers, such as polyacrylic amide, polymethacrylic amide, poly(hydroxyalkylvinyl ethers), poly(hydroxyalkylacrylates) and polymethacrylates (e.g. polyglycidyl-methacrylate), polyvinylalcohols and polymers based on styrenes and divinylbenzenes, and copolymers in which two or more of the monomers corresponding to the above-mentioned polymers are included. Polymers, which are soluble in water, may be derivatized to become insoluble, e.g. by cross-linking and by coupling to an insoluble body via adsorption or covalent binding. Hydrophilic groups can be introduced on hydrophobic polymers (e.g. on copolymers of monovinyl and divinylbenzenes) by polymerisation of monomers exhibiting groups which can be converted to OH, or by hydrophilization of the final polymer, e.g. by adsorption of suitable compounds, such as hydrophilic polymers. Suitable inorganic materials to be used in base matrices are silica, zirconium oxide, graphite, tantalum oxide etc. The matrix can be homogeneously derivatized by the cation-exchanger ligand or only partially in a special designed way.

Preferred matrices lack groups that are unstable against hydrolysis, such as silan, ester, amide groups and groups present in silica as such. This in particular applies with respect to groups that are in direct contact with the liquids used. The matrix may be porous or non-porous. This means that the matrix may be fully or partially permeable (porous) or completely impermeable to the substance to be removed (non-porous). The matrix can alternatively be in the form of irregular or spherical particles with sizes in the range of 1–1000 μm, preferably 5–50 μm for high performance applications and 50–300 μm for preparative purposes. An interesting form of matrices has densities higher or lower than the liquid. This kind of matrices is especially applicable in large-scale operations for fluidised or expanded bed chromatography as well as for different batch wise procedures, e.g. in stirred tanks. Fluidised and expanded bed procedures are described in WO 9218237 (Amersham Pharmacia Biotech AB) and WO 9200799 (Kem-En-Tek). The term hydrophilic matrix means that the accessible surface of the matrix is hydrophilic in the sense that aqueous liquids are able to penetrate the matrix. Typically the accessible surfaces on a hydrophilic base matrix expose a plurality of polar groups for instance comprising oxygen and/or nitrogen atoms. Examples of such polar groups are hydroxyl, amino, carboxy, ester, ether of lower alkyls (such as (—CH$_2$CH$_2$O—)$_n$H where n is an integer).

A second aspect of the present invention is a method of generating a separation medium comprising mixed mode cation-exchanger ligands coupled to a base matrix, which method comprises the steps of (a) providing at least one scaffold derivative having a cyclic structure;

(b) opening up of the cyclic structure of the derivative; and (c) coupling the opened product so obtained with a base matrix comprising a reactive group, which is optionally coupled to the base matrix via a spacer;

wherein said scaffold derivative can be defined by the general formula (III)

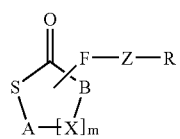

(III)

wherein A, B and X irrespective of each other are $sp^2$ or $sp^3$-hybridised carbons or any heteroatoms, such as oxygen, sulphur, nitrogen and/or silica, and m is any integer between 0 and 4, such as 1–3, preferably 1 or 2, said functionalities being present on the cyclic structure in adjacent positions, and wherein in step (c), opening up is provided by breaking the bond between said two adjacent positions, and wherein a Z-R is coupled to any one of A, B and X, preferably to B.

Step (b) can be performed as discussed above in relation to the first aspect of the invention.

As the skilled in this field realises, this aspect corresponds to the first aspect of the invention, except that one starting product is a readily manufactured scaffold derivative. Thus, the second aspect is a simplified alternative to the first aspect, and is especially advantageous in cases where the nature of scaffold and derivatization agent can result in an easily stored product. It is envisaged that in some cases, such a derivative may be commercially available or produced at one time to be stored and used later. Further details regarding the nature and properties of the scaffold derivative used in this aspect can be found above in relation to scaffold and derivatization agent, respectively.

A third aspect of the present invention is a kit which comprises a compound defined by the general formula (I) as defined above or a derivative defined by the general formula (III), also as defined above. The present kit comprises such a compound or derivative as a solid together with written instructions for use thereof in the manufacture of a mixed mode cation-exchanger ligand coupled to a base matrix for use as a separation medium. In an alternative embodiment, the compound or derivative is present as dissolved in a suitable solvent.

An additional aspect of the present invention is a screening method wherein separation media useful in cation exchange are identified. As mentioned above, the choice of R can be made among a large variety of different molecules depending on the desired properties of the final separation medium. In the experimental part below, some examples of tested R-groups will be provided, which however are provided only to illustrate the great versatility of the present method and to serve as some guidance for the skilled in this field who will want to design a specific embodiment within the scope of the present invention. In the experimental part, it is understood that R' could be equivalent to R. Accordingly, the present invention enables design of a large diversity of desired mixed mode cation exchanger ligand separation medium. For example, in order to test possible mixed mode cation-exchanger ligands, a combinatorial library of R-groups can be produced, wherein specific parts of one original molecule are systematically varied to find the combination that gives the optimum characteristics toward a specific target. Such combinatorial libraries are these days well known and utilised within many fields, and the skilled can therefore design his own library based on considerations within common general knowledge of any organic chemist or biochemist.

For example, testing of a library can e.g. include the steps of (a) providing a library which comprises
   (i) one or more cation-exchangers to be tested (test cation-exchangers, exchangers 1, 2, 3, 4 . . . n; n=an integer>0) each of which cation-exchangers differs with respect to kind of ligand (ligands 1, 2, 3, 4 . . . n), and
   (ii) a reference cation-exchanger having a reference ligand, the support matrix, counter-ion etc being essentially the same in the exchangers 1, 2, 3, 4 . . . n and in the reference cation-exchanger;

(b) determining the maximal breakthrough capacity somewhere in the pH-interval 2–12 of exchanger 1 for the substance at a predetermined condition;

(c) determining the maximal breakthrough capacity in the pH-interval 2–12 of the reference cation-exchanger for the substance at the same condition as in step (b);

(d) concluding with the aid of the relation between the maximal break-through capacities obtained in steps (b) and (c), if cation-exchanger (1) is appropriate to use for removing the substance; and (e) repeating, if necessary, steps (b)–(c) for at least one of the exchangers 2, 3, 4 . . . n.

In case the degree of substitution varies between the reference cation-exchanger and the individual cation-exchangers to be tested this should be accounted for when step (d) is carried out. This in particular applies if the variation in degree of substitution is large for instance with a factor greater than 3, 5 or 10 for cation-exchangers 1, 2 . . . n.

A last aspect of the present invention is a method, preferably a screening method, of optimising the binding properties of a separation medium comprising mixed mode cation-exchanger ligands, which comprises the steps of (a) providing an activated scaffold derivative in an aqueous solution;

(b) contacting the solution with a suspension of base matrix particles defined by a first property and capable of binding said scaffold derivative;

(c) separating solution from particles;

(d) contacting the separated solution with a suspension of base matrix particles defined by a property different from said first property and capable of binding said scaffold derivative;

(e) separating solution from particles;

(f) optionally repeating steps (d) and (e) one or several times; and (g) evaluating of the capacity of the separation medium so obtained by routine ion exchange experiments.

In one embodiment, said property is the density of reactive groups present on the base matrix particles that are capable of binding activated scaffold. In an alternative embodiment, said property is the nature of the reactive groups present on the base matrix particles that are capable of binding activated scaffold. However, the present method can be used with a variation of practically any property such as particles size, porosity, rigidity or conditions of coupling, such as pH, time, temperature etc, the one essential feature being that the reactive solution is passed over a set of different such conditions in order to identify optimum values. In an advantageous embodiment of the present method, the scaffold derivative used in this aspect has been produced according to the method described above.

The level of cation-exchange ligands in the cation-exchangers used in the invention is usually selected in the interval of 0.001–4 mmol/ml matrix, such as 0.002–0.5 mmol/ml matrix, with preference for 0.005–0.3 mmol/ml matrix. Possible and preferred ranges are among others determined by the kind of matrix, ligand, substance to be removed etc. Thus, the level of cation-exchange ligands is usually within the range of 0.01–0.3 with preference for 0.06–0.2 mmol/ml for agarose based matrices. For dextran based matrices the interval is typically 0.01–0.6 mmol/ml matrix with subrange being 0.01–0.2 mmol/ml matrix. In the certain variants, for instance when R is an aromatic, the level of the mixed mode ligand is often at the lower half part of these intervals. In these variants of the invention the levels of cation-exchange ligand thus are smaller than 0.150 mmol per ml matrix and/or smaller than 1 mmol per gram dry weight of matrix The expression "mmol per ml matrix refers" to fully sedimented matrices saturated with water. The capacity range refers to the capacity of the matrix in fully deprotonated form to titrate the acid function. It includes a possible contribution also from negatively charged groups other than the main ionic group in the ligand, for instance in the spacer or the residue R.

The separation medium produced according to the present invention can be used by conventional methods well known to the skilled, such as in cation exchange and especially mixed mode cation exchange. At present, the most advantageous use of a separation medium generated according to the method of the invention is as high salt ligands. However, the present separation medium works with as good a capacity as the previously known media in traditional cation-exchange procedures under normal conditions, which conditions can be defined by working below about 10 mS. Separation media generated according to the method of the present invention will also work satisfactory in the range between the above mentioned normal conditions and high salt conditions, as discussed below.

Thus, a separation medium generated according to the present method can advantageously be used as a cation-exchanger that adsorb the particular substance at relatively high ionic strengths, known as a high salt ligand. Such a cation-exchanger should be capable of:

(a) binding the substance of interest in an aqueous reference liquid at an ionic strength corresponding to 0.25 M NaCl, and (b) permitting a maximal break through capacity somewhere in the pH interval of 2–12 for the substance $\geq$200%, such as$\geq$300% or$\geq$500% or$\geq$1000%, of the break through capacity of the substance for a conventional cation-exchanger.

The term "break through capacity" is a well known term within this field and methods for the calculation thereof are well known and also described below in the experimental part of the application. Primarily these percentage figures apply to measurements made during cation-exchanger conditions.

More specifically, during adsorption a liquid sample containing a positively charged substance is contacted with the cation-exchanger under conditions leading to binding of the substance to the ligand via cation-exchange. The pH is selected such that the substance is, at least partially, positively charged and at least a part of the cation-exchange ligands are negatively charged. In the preferred variants, weak cation-exchangers (for instance where the anionic group is —COO$^-$) are used with pH of the liquid buffered to pKa$\pm$2, such as$\pm$1, pH-units. The pKa-value of the cation-exchanger is taken as the inflection point when the cation-exchanger is titrated with NaOH. The ionic strength (measured as salt concentration or conductivity) is typically below the elution ionic strength for the particular combination of cation-exchanger, substance to be bound, temperature and pH, solvent composition etc. One of the benefits of using the multimodal anion exchangers is that it will then be possible to run adsorption/binding also at elevated ionic strengths compared to conventional cation-exchangers. By matching the cation-exchanger to the substance to be removed, the adsorption may be carried out at an ionic strength that is higher than when using the reference ion exchanger (measured at the same pH and otherwise the same conditions). Depending on the cation-exchanger breakthrough capacities$\geq$200%, such as$\geq$300% or$\geq$500% and even$\geq$1000% of the breakthrough capacity obtained with the reference cation-exchanger may be accomplished.

The exact ionic strength to be used during binding will depend on the ligand used, its density on the matrix, the substance to be bound and its concentration etc. Useful ionic strengths often correspond to NaCl concentrations (pure water)$\geq$0.1 M, such as$\geq$0.3 M or even$\geq$0.5 M.

In desorption, procedures that are well known in the art are conveniently used, such as an increase of the salt concentration (ionic strength) above the minimum elution ionic strength required for desorption; a decrease of pH in order to lower the negative charge of the ligands; an increase of pH for decreasing the positive charge on the substance; and/or by including a ligand analogue or an agent (e.g. a solvent additive) that reduces the polarity of the aqueous liquids used. The changes are relative to the aqueous liquid containing the substance. Desorption under cation-exchange conditions means that the liquid used for desorption provides conditions (for instance pH) such that at least a portion of the substance to be desorbed is positively charged, and the ionic strength is set to a value above the minimum elution ionic strength for these conditions. For amphoteric compounds, the first mentioned options imply that pH$\geq$pI such as pH$\geq$pI+0.5.

Desorption may also be carried out during conditions (for instance pH) at which the substance to be desorbed has net charge of zero or less and/or essentially all of the cation-exchange ligands are decharged.

In chromatographic and/or batch procedures the matrix with the substance to be desorbed is present in a column-or other suitable vessel in contact with the adsorption liquid. The conditions provided by the liquid is then changed as described above until the desired substance is released and eluted from the matrix. For desorption processes carried out under cation-exchange conditions the ionic strength typically is increased compared to the adsorption and corresponds often to at least 0.6 M NaCl. The actual values depend on the various factors discussed above.

The change in conditions discussed above can be accomplished in one or more steps (step-wise gradient) or continuously (continuous gradient). The various variables of the liquid in contact with the matrix may be changed one by one or in combination.

Typical salts useful for changing the ionic strength are selected among soluble ammonium or metal salts of phosphates, sulphates, etc, in particular alkali metal and/or alkaline earth metal salts. The same salts can also be used in the adsorption steps, but then often in lower concentrations.

Typical buffer components useful in cation exchange procedures can be selected among acid/base pairs in which the base part is anionic. Mustrative examples are carboxylic acids/carboxylates (e.g. acetic acid/acetate), phosphates etc.

An increase in pH in the desorption step or earlier will reduce the positive charge of the substance to be desorbed, assist desorption and thus also reduce the ionic strength needed for release of the substance from the matrix. Depending on the pKa of the ligand used and the pI of the substance, a decrease in pH may lead to the release or binding of the substance from/to the cation-exchange matrix.

Desorption may also be assisted by adjusting the polarity of the desorption liquid, compared to adsorption liquid. This may be accomplished by including a water-miscible and/or less hydrophilic organic solvent in the desorption liquid. Examples of such solvents are acetone, methanol, ethanol, propanols, butanols, dimethyl sulfoxide, dimethyl formamide, acrylonitrile etc. A decrease in polarity of the desorption liquid is likely to assist in desorption and thus also reduce the ionic strength needed for release of the compound from the matrix. Desorption may also be assisted by including a soluble structure analogue (ligand analogue) of the cation-exchange ligand in the desorption liquid. The sufficient concentration of such an analogue is at least larger than its concentration in adsorption liquid.

DETAILED DESCRIPTION OF THE DRAWINGS

FIG. 1 shows an example of a traditional synthesis of multimodal cation exchanger media as discussed in general terms in the section "Background" above. It appears from the drawing how the gel being the solid support where the synthesis of the ligand is taking place, has to be present.

FIG. 2 shows one embodiment of the present invention for synthesis of multimodal cation exchanger media using homocysteine thiolactone as a scaffold. In principle, the method according to the invention is comprised of two steps, as compared to the prior art four step procedure, and the gel part of the ligand needs only be included in the last step.

FIG. 3 illustrates the potential diversity of libraries of multimodal cation exchanger media via the exemplary scaffold homocysteine thiolactone. The number of possible R-residues is vast and is discussed in more detail above, while specific examples will be described below in the experimental part.

FIG. 4 illustrates in a schematic way the general procedure to synthesise different libraries of media from the same set of reactive solutions. Such a method can be used with a variation of practically any property such as particles size, porosity, rigidity or conditions of coupling, such as pH, time, temperature etc.

Below, the present invention is to be illustrated by way of examples. However, it is to be understood that the present examples are provided for illustrative purposes only and should not be construed to limit the present invention as defined by the appended claims. All references given below and elsewhere in the present application are hereby included by reference.

EXPERIMENTAL PART

General Procedure Using DL-homocysteine Thiolactone to Generate New Media:

A. Thiolactone Opened by Hydrolysis

Scheme 1:
General synthetic scheme

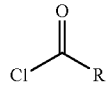

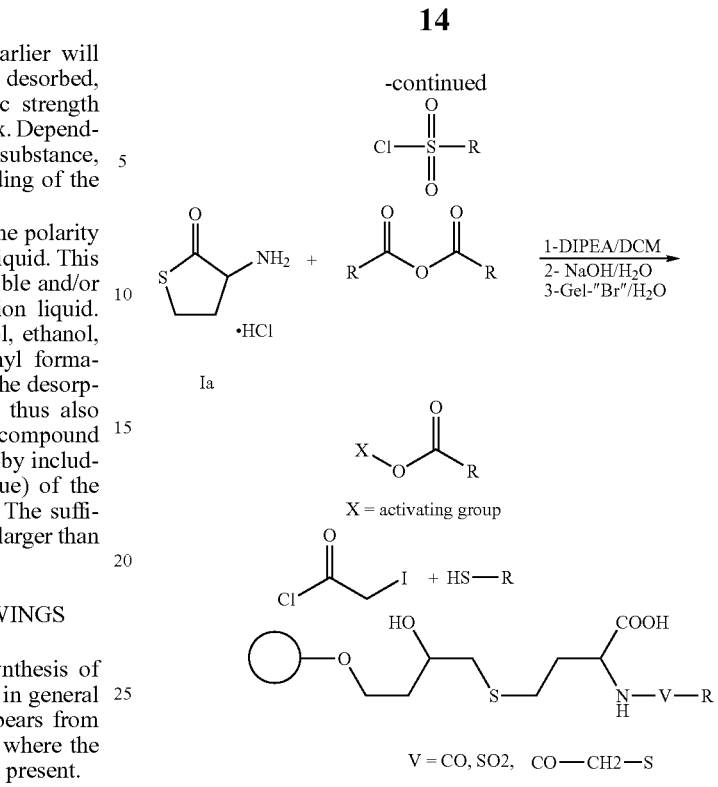

General Procedure

Step 1:

Step 1a:

A solution A of DL-homocysteine thiolactone Ia and di-isopropylamine (DIPEA) in dichloromethane (DCM) was cooled down to 0° C. A solution B containing an acyl chloride or a sulfonyl chloride or an anhydride or an activated acid in DCM was cooled down to 0° C., and added dropwise to the solution A maintained between 0 and 5° C. The mixture was stirred overnight at room temperature.

Step 1b:

A solution A of DL-homocysteine thiolactone Ia and di-isopropylamine (DIPEA) in dichloromethane (DCM) was cooled down to 0° C. A solution B of iodoacetyl chloride in DCM was added dropwise to the solution A maintained between 0 and 5° C. The mixture was stirred overnight at room temperature. A solution B containing a thiol in DCM was then added dropwise to the reaction mixture and the stirring was maintained for another 17h.

Step 2:

The solvent was removed under vacuum from the mixture issued from Step 1a or Step 1b. At 0° C. a sodium hydroxide solution 5N was added slowly to the crude and it was further stirred for 2 hours at room temperature.

Step 3:

Brominated Sepharose® 6FF (Amersham Biosciences AB, Uppsala, Sweden) obtained following a well-known procedure was mixed with the alkaline solution from Step 2 and warmed up to 50° C. overnight. After reaction, the gel (1 volume) was filtered and washed with water (2×15 vol.), ethanol (2×15 vol.), acetic acid 0.2M (2×15 vol.) and water (2×15 vol.). The ionic capacity of the gels was then measured by titration of the acid (Chauhan V. S. et al., *Tetrahedron*, 44 (8), 2359–2366, 1988 (acid activation)). The chromatographic evaluations (retention and capacity) of these gels are shown in Table 1A below.

EXAMPLES

Generation of Separation Media According to the Invention Using Different R-Z-Groups Examples 1–4

The following examples were using D,L homocysteine thiolactone Ia as a scaffold and the described chemistry (cf. Scheme 1 above). After formation of the amide or the sulphonamide bound by reacting homocysteine thiolactone Ia with acyl chlorides, sulfonyl chlorides, anhydrides or activated acid, the opening of the thiolactone ring was realised with basic hydrolysis and the resulting compound further coupled to an activated Sepharose® 6FF or Sepharose® 4FF (both from Amersham Biosciences AB, Uppsala, Sweden).

All the solutions A were freshly prepared but it is possible to reuse the solution mixture issued from the filtration after the coupling reaction (in Step 3) and to further react it with another gel. In the following examples the filtrate from the first reaction (gel with an allyl loading of 411 μmol/mL) was further used with a gel with an allyl loading of 250 μmol/mL according to Step 1a, 2 and 3. In Table 1A the results from the gel with an allyl loading of 411 μmol/mL are indicated by a) while the results from allyl loading of 250 μmol/mL are indicated with b), and the results from allyl loading of 230 μmol/mL are indicated with c).

For the examples 1 to 4 the solution A was prepared according to Step 1a with 1.58 g of DL-homocysteine thiolactone, HCl (10.3 mmol) and 3.58 mL of di-isopropyl-ethyl amine (DIPEA) (20.6 mmol) in 6 mL of DCM.

Example 1

Acyl Chlorides

1a. The solution B was prepared with 2.37 g (10.3 mmol) of 3,4,5-trimethoxy-benzoyl chloride in 4 mL DCM and according to Step 1a, added to solution A. Following Step 2 the solvent was removed and 6 mL of a solution of sodium hydroxide 5N was added to the crude material. According to Step 3, 5 mL of brominated Sepharose® 6FF (Amersham Biosciences AB, Uppsala, Sweden) with an allyl loading of 411 μmol/mL of gel was added to the mixture. The ionic capacity of the gel 1a was 232.6 μmol/nL.

1b. The solution B was prepared with 1.80 g (10.3 mmol) of 4-chlorobenzoyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1b was 251.1 μmol/mL.

1c. The solution B was prepared with 2.15 g (10.3 mmol) of 2,4-dichlorobenzoyl chloride in 4 nL DCM and according Step 1a, added to solution A. Following Step 2 the solvent was removed and 6 mL of a solution of sodium hydroxide 5N was added to the crude material. According to Step 3,5 mL of brominated Sepharose® 6FF with an allyl loading of 411 μmol/mL of gel was added to the mixture. The ionic capacity of the gel 1c was 253.3 μmol/mL.

1d. The solution B was prepared with 2.14 g (10.3 mmol) of 3-(trifluoromethyl)benzoyl chloride in 4 mL DCM and according Step 1a, added to solution A. Following Step 2 the solvent was removed and 6 mL of a solution of sodium hydroxide 5N was added to the crude material. According to Step 3,5 mL of brominated Sepharose® 6FF with an allyl loading of 411 μmol/mL of gel was added to the mixture. The ionic capacity of the gel 1d was 239.9 μmol/mL.

1e. The solution B was prepared with 2.14 g (10.3 mmol) of 4-(trifluoromethyl)benzoyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1e was 247.1 μmol/mL.

1f. The solution B was prepared with 1.83 g (10.3 mmol) of nicotinoyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1f was 253.3 μmol/mL.

1g. The solution B was prepared with 1.65 g (10.3 mmol) of thiophene-2-acetyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1g *was* 261.5 μmol/mL.

1h. The solution B was prepared with 1.10 g (10.3 mmol) of butyryl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1h was 260.6 μmol/mL.

1i. The solution B was prepared with 1.67 g (10.3 mmol) of octanoyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1i was 233.6 μmol/nL.

1j. The solution B was prepared with 1.24 g (10.3 mmol) of isovaleryl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1j was 232.4 μmol/mL.

1k. The solution B was prepared with 1.57 g (10.3 mmol) of 2-(2-methoxy-ethoxy)acetyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 μmol/mL of gel was added to the mixture. The ionic capacity of the gel 1k was 234.0 μmol/mL.

Example 2

Sulfonyl Chlorides

2a. The solution B was prepared with 1.96 g (10.3 mmol) of toluene-4-sulfonyl chloride in 4 mL DCM and according Step 1a, added to solution A Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel 2a was 199.0 µmol/mL.

2b. The solution B was prepared with 2.43 g (10.3 mmol) of 2,5-dimethoxybenzenesulfonyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel 2b was 182.6 µmol/mL.

2c. The solution B was prepared with 2.40 g (10.3 mmol) of 4-acetamidobenzenesulfonyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel 2c was 159.7 µmol/mL.

2d. The solution B was prepared with 2.25 g (10.3 mmol) of 2,4,6-trimethylbenzenesulfonyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel 2d was 176.5 µmol/mL.

2e. The solution B was prepared with 1.18 g (10.3 mmol) of methanesulfonyl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel 2e was 163.2 µmol/mL.

Example 3

Anhydrides

3a. The solution B was prepared with 2.33 g (10.3 mmol) of benzoic anhydride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel 3a was 255.1 µmol/mL.

3b. The solution B was prepared with 1.34 g (10.3 mmol) of propionic anhydride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel 3b was 238.3 µmol/mL.

Example 4

Activated Acids

4a. The activated acid was freshly prepared from the carboxylic acid as followed: A solution of 1.84 g (10.3 mmol) of hippuric acid and 1.13 mL of N-methylmorpholine in 20 mL of tetrahydrofuran (THF) was cooled down to −8° C. before the slow addition of 1.33 mL of isobutylchloroformate in 5 mL THF. This mixture was stirred 2 h at 0° C. and at room temperature overnight before evaporation of the solvent. The solution B was prepared by dissolving the crude in 4 mL of DCM, and added to solution A according to Step 1a. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was Sepharose® 6FF with an allyl loading of 411 µmol/mL of gel was added to the mixture. The ionic capacity of the gel 4a was 182.4 µmol/mL.

Example 5

Iodoactyl Chloride and Thiols

The following examples were using D,L homocysteine thiolactone Ia as a scaffold and the described chemistry (cf. Scheme 1 above). The formation of the amide was done by reaction of homocysteine thiolactone Ia with iodoacetyl chloride. A thiol was introduced on the resulting ligand by nucleophllic substitution of the remaining halogen. The opening of the thiolactone ring was realised with basic hydrolysis and the resulting compound further coupled to an activated Sepharose® 6FF or Sepharose® 4FF.

For all the examples 5 the solution A was prepared according to Step 1b with 0.35 g of DL-homocysteine thiolactone, HCl (2.3 mmol) and 0.841 µL of di-isopropylethyl amine (DIPEA) (4.8 mmol) in 4 mL of DCM. To the cooled down reaction mixture, 0.52 g of iodoacetyl chloride (2.5 mmol) in 2 mL of DCM was added.

5a. The solution B was prepared with 284 µl (2.3 mmol) benzyl mercaptan in 1 mL DCM and according Step 1b, added to solution A. Following Step 2 the solvent was removed and 5 mL of a solution of sodium hydroxide 5N was added to the crude material. According to Step 3, 4 mL of brominated Sepharose® 6FF with an allyl loading of 230 µmol/mL of gel was added to the mixture. The ionic capacity of the gel 5a was 118.2 µmol/mL.

5b. The solution B was prepared with 243 µl (2.3 mmol) furfuiryl mercaptan in 1 mL DCM and according Step 1b, added to solution A. Following Step 2 the solvent was removed and 5 mL of a solution of sodium hydroxide 5N was added to the crude material. According to Step 3, 4 mL of brominated Sepharose® 6FF with an allyl loading of 230 µmol/mL of gel was added to the mixture. The ionic capacity of the gel 5b was 114.1 µmol/mL.

5c. The solution B was prepared with 373 mg (2.3 mmol) 4-mercapto-benzoic acid in 1 mL DCM and according Step 1b, added to solution A. Following Step 2 the solvent was removed and 5 mL of a solution of sodium hydroxide 5N was added to the crude material. According to Step 3, 4 mL of brominated Sepharose® 6FF with an allyl loading of 230 µmol/mL of gel was added to the mixture. The ionic capacity of the gel 5c was 184.8 µmol/mL.

5d. The solution B was prepared with 251 µl (2.3 mmol) 2-methyl-1-propanethiol in 1 mL DCM and according Step 1b, added to solution A. Following Step 2 the solvent was removed and 5 mL of a solution of sodium hydroxide 5N was added to the crude material. According to Step 3, 4 mL of brominated Sepharose® 6FF with an allyl loading of 230 µmol/mL of gel was added to the mixture. The ionic capacity of the gel 5d was 155.0 µmol/mL.

5e. The solution B was prepared with 205 µl (2.3 mmol) 2,2,2-trifluoro-ethanethiol in 1 mL DCM and according Step 1b, added to solution A. Following Step 2 the solvent was removed and 5 mL of a solution of sodium hydroxide 5N was added to the crude material. According to Step 3, 4 mL of brominated Sepharose® 6FF with an allyl loading of 230 µmol/mL of gel was added to the mixture. The ionic capacity of the gel 5e was 125.4 µmol/mL.

TABLE 1A
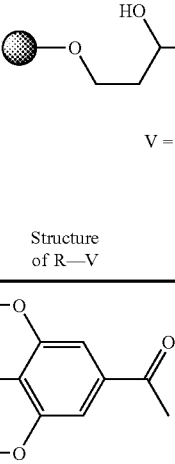
V = CO, SO2, CO—CH₂—S
| Code | Structure of R—V | Ionic capacity (μmol/mL) | Retention Cyt C (mS/cm) | Capacity BSA (mg/mL) | Capacity IgG (mg/mL) |
|---|---|---|---|---|---|
| 1a | 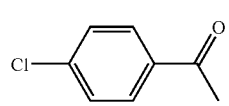 | 232.6[a]<br>151.7[b] | 44.9<br>38.1 | 33.9<br>36.2 | 15.5<br>30.2 |
| 1b | 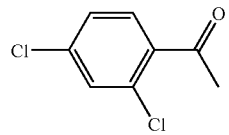 | 251.1[a]<br>155.8[b] | 79.3<br>60.0 | 33.6<br>37.3 | 13.2<br>26.2 |
| 1c | 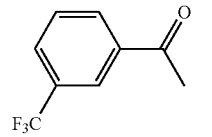 | 253.3[a]<br>160.4[b] | 71.6<br>60.5 | 33.6<br>38.0 | 12.8<br>23.4 |
| 1d | 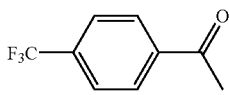 | 239.9[a]<br>88.5[b] | 71.7<br>37.6 | 36.2<br>44.1 | 17.2<br>31.4 |
| 1e | 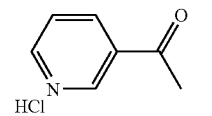 | 247.1[a]<br>140.1[b] | 90.0<br>57.5 | 34.0<br>48.1 | 16.7<br>26.3 |
| 1f | 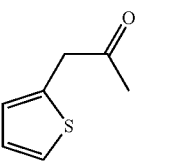 | 253.3[a]<br>145.6[b] | 36.7<br>29.9 | 34.7<br>30.0 | 27.5<br>16.7 |
| 1g | 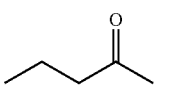 | 261.5[a]<br>115.8[b] | 47.0<br>31.4 | 41.0<br>44.7 | 28.6<br>28.3 |
| 1h | 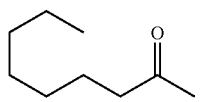 | 260.6[a]<br>161.2[b] | 33.0<br>33.0 | 48.8<br>36.4 | 29.4<br>14.7 |
| 1i | 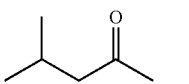 | 233.6[a]<br>165.7[b] | 50.3<br>43.0 | 30.1<br>42.6 | 18.3<br>23.2 |
| 1j |  | 232.4[a]<br>162.8[b] | 34.4<br>32.1 | 43.8<br>50.1 | 25.7<br>25.7 |

TABLE 1A-continued

Structure with: HO, COOH, bead-O-CH2-CH(OH)-CH2-S-CH2-CH2-CH(COOH)-NH-V-R

V = CO, SO2, CO—CH2—S

| Code | Structure of R—V | Ionic capacity (μmol/mL) | Retention Cyt C (mS/cm) | Capacity BSA (mg/mL) | Capacity IgG (mg/mL) |
|---|---|---|---|---|---|
| 1k | methoxymethoxy acetone (MeO-CH2-O-CH2-CO-CH3) | 234.0[a]<br>165.1[b] | 28.7<br>25.9 | 22.2<br>18.4 | 6.4<br>3.7 |
| 2a | 4-methylphenyl sulfonyl | 199.0[a]<br>90.1[b] | 76.5<br>51.8 | 38.8<br>55.0 | 17.9<br>26.6 |
| 2b | 2,5-dimethoxyphenyl sulfonyl | 182.6[a]<br>109.9[b] | 59.7<br>52.4 | 38.8<br>48.0 | 18.4<br>18.9 |
| 2c | 4-acetamidophenyl sulfonyl | 159.7[a]<br>119.3[b] | 57.7<br>46.8 | 38.7<br>42.1 | 21.9<br>21.0 |
| 2d | 2,4,6-trimethylphenyl sulfonyl | 176.5[a]<br>67.5[b] | 92.1<br>39.1 | 35.7<br>34.8 | 17.1<br>18.5 |
| 2e | methyl sulfonyl (H3C-SO2-) | 163.2[a]<br>87.3[b] | 31.7<br>29.2 | 31.6<br>41.7 | 18.0<br>10.4 |
| 3a | phenyl C(=O)- (benzoyl) | 255.1[a]<br>196.0[b] | 56.8<br>48.5 | 36.0<br>48.8 | 14.4<br>24.9 |
| 3b | propionyl (CH3CH2-C(=O)-) | 238.8[a]<br>144.9[b] | 34.7<br>28.6 | 17.4<br>14.6 | 10.0<br>4.7 |
| 4a | benzoylamino acetone | 151.4[b] | 38.5 | 5.4 | 4.3 |
| 5a | benzylthio acetone | 118.2[c] | Nd | 41.6 | 17.0 |

TABLE 1A-continued

Structure at top of table (R—V attached via thioether):
HO—●—O—CH₂—CH(OH)—CH₂—S—CH₂—CH₂—CH(COOH)—NH—V—R

V = CO, SO2, CO—CH₂—S

| Code | Structure of R—V | Ionic capacity (μmol/mL) | Retention Cyt C (mS/cm) | Capacity BSA (mg/mL) | Capacity IgG (mg/mL) |
|---|---|---|---|---|---|
| 5b | (furan-2-yl)-CH₂-S-CH₂-C(=O)- | 114.1[c] | Nd | 36.7 | 16.2 |
| 5c | HO₂C-C₆H₄-S-CH₂-C(=O)- | 184.8[c] | Nd | 43.2 | 20.9 |
| 5d | (CH₃)₂CH-CH₂-S-CH₂-C(=O)- | 155.0[c] | Nd | 53.5 | 27.1 |
| 5e | F₃C-CH₂-S-CH₂-C(=O)- | 125.4[c] | Nd | 57.0 | 33.3 |

[a]ionic capacity obtained with a gel Sepharose ® 6FF with an allyl loading of 411 μmol/mL.
[b]ionic capacity obtained with a gel Sepharose ® 6FF with an allyl loading of 250 μmol/mL
[c]ionic capacity obtained with a gel Sepharose ® 6FF with an allyl loading of 230 μmol/mL.
Nd: not determined.

B. Thiolactone Opened By Nucleophilic Agent:

Scheme 2:
Thiolactone opened by an amino acid

1. Amino acid:

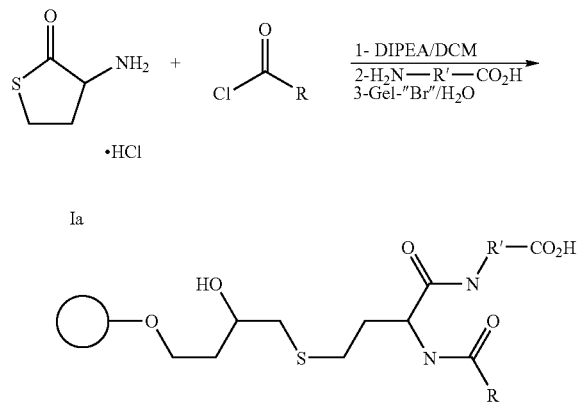

Example 6

Benzoyl Chloride and Phenyl Serine

The following example was using D,L homocysteine thiolactone Ia as a scaffold and the described chemistry (cf. Scheme 2 above). After formation of the amide bound by reacting homocysteine thiolactone Ia with an acyl chloride, the opening of the thiolactone ring was realised with an amino acid derivative and the resulting compound further coupled to an activated Sepharose®.

In Table 1B below the results from the gel with an allyl loading of 230 μmol/mL are indicated with c).

A solution A of 1.58 g of DL-homocysteine thiolactone, HCl (10.3 mmol) and 3.58 mL of di-isopropyl-ethyl amine (DIPEA) (20.6 mmol) in 6 mL of DCM was prepared and cooled down to 0° C. Another solution was prepared with 1.45 g (10.3 mmol) of benzoyl chloride in 4 mL DCM and added dropwise to solution A. After 17h of stirring at room temperature the solvent was removed. To the crude mixture, 50 ml of THF and 1.8 mL (10.3 mmol) of DIPEA and 3,52 g (20.6 mmol) of DL-phenylserine hydrate were added. The reaction was heated at 50° C. overnight. The solvent was removed under vacuum and 50 mL of a solution of potassium carbonate 10% in water were added. The aqueous phase was washed with ethyl acetate (EtOAc) (3×15 mL), acidified with citric acid and extracted with EtOAc (3×15 mL). The organic phase was dried with sodium sulphate and concentrated under vacuum.

6 mL of a solution of sodium hydroxide 5N was added to the crude material. 5 mL of brominated Sepharose® 6FF with an allyl loading of 230 μmol/mL of gel was added to the alkaline mixture and warmed up to 50° C. overnight. After reaction, the gel (1 volume) was filtered and washed with water (2×15 vol.), ethanol (2×15 vol.), acetic acid 0.2M (2×15 vol.) and water (2×15 vol.). The ionic capacity of the gels was then measured by titration of the acid. The chromatographic evaluations of these gels are shown in Table 1B below.

The ionic capacity of the gel 6 was 148.3 μmol/mL.

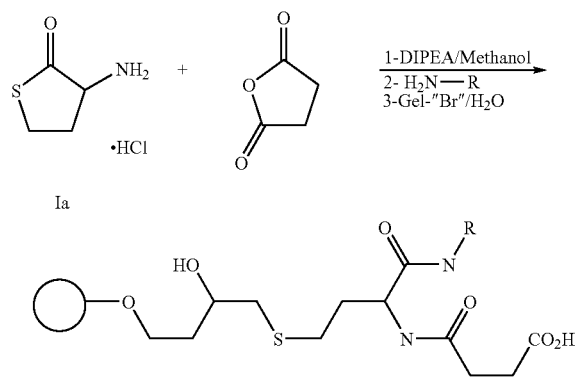

Scheme 3:
Thiolactone opened by an amine

Example 7

Succinic Anhydride and Aniline

The following example was using D,L homocysteine thiolactone Ia as a scaffold and the described chemistry (cf. Scheme 3 above). After formation of the amide bound by reacting homocysteine thiolactone Ia with an anhydride, the opening of the thiolactone ring was realised with an amine and the resulting compound further coupled to an activated Sepharose®.

In Table 1B below the results from the gel with an allyl loading of 230 μmol/mL are indicated with c).

A solution of 1.58 g of DL-homocysteine thiolactone, HCl (10.3 mmol) and 3.58 mL of di-isopropyl-ethyl amine (DIPEA) (20.6 mmol) in 50 mL of methanol was prepared and cooled down to 0° C. 0.93 g (9.3 mmol) of succinic anhydride was added in small portions to the thiolactone. After 17 h of stirring at room temperature the solvent was removed.

To the crude mixture, 20 ml of THF and 1.3 mL (15.3 mmol) of were added. The reaction was refluxing overnight. The solvent was removed under vacuum and 50 mL of a solution of potassium carbonate 10% in water were added. The aqueous phase was washed with ethyl acetate (EtOAc) (3×15 mL), acidified with citric acid and extracted with EtOAc (3×15 mL). The organic phase was dried with sodium sulphate and concentrated under vacuum.

6 mL of a solution of sodium hydroxide 5N was added to the crude material. 5 mL of brominated Sepharose® 6FF with an allyl loading of 230 μmol/mL of gel was added to the alkaline mixture and warmed up to 50° C. overnight. After reaction, the gel (1 volume) was filtered and washed with water (2×15 vol.), ethanol (2×15 vol.), acetic acid 0.2M (2×15 vol.) and water (2×15 vol.). The ionic capacity of the gels was then measured by titration of the acid. The chromatographic evaluations of these gels are shown in Table 1B below.

The ionic capacity of the gel 7 was 155.1 μmol/mL.

TABLE 1B

| Code | Structure of the gel | Ionic capacity (μmol/mL) | Capacity BSA (mg/mL) | Capacity IgG (mg/mL) |
|---|---|---|---|---|
| 6 | 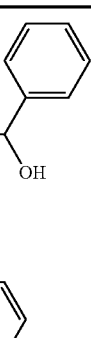 | 148.3[c] | 47.3 | 17.4 |
| 7 |  | 155.1[c] | 42.8 | 25.7 |

[c] ionic capacity obtained with a gel Sepharose ® 6FF with an allyl loading of 230 μmol/mL.

Examples 8–11

Optimisation of Matrix

A reaction mixture can be used several times to react with different matrix, and/or for a same matrix different level of allyl loading.

Example 8

Level 1:

The gel 1j was prepared as described above. The solution B was prepared with 1.24 g (10.3 mmol) of isovaleryl chloride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture. The ionic capacity of the gel1j was 232.4 µmol/mL. The chromatographic evaluations (retention and capacity) of this gel are shown in table 2.

Level 2:

The solution resulting from the filtration directly after the coupling to the matrix at 411 µmol/mL (level 1) was reacted with an activated Sepharose® 6FF with an allyl loading of 250 µmol/mL. The coupling was made according to Step 3. The generated gel 1j-2 present an ionic capacity of 162.8 µmol/mL. The chromatographic evaluations (retention and capacity) of this gel are shown in table 2.

Level 3:

The solution resulting from the filtration directly after the coupling to the matrix at 250 µmol/mL (level 2) was reacted with an activated Sepharose® 6FF with an allyl loading of 138 µmol/mL. The coupling was made according to Step3. The generated gel 1j-3 present an ionic capacity of 104.2 µmol/mL. The chromatographic evaluations (retention and capacity) of this gel are shown in table 2 below.

Example 9

Level 1:

The gel 3a was prepared as described in the part A: The solution B was prepared with 2.33 g (10.3 mmol) of benzoic anhydride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 6FF with an allyl loading of 411 µmol/mL of gel was added to the mixture The ionic capacity of the gel 3a was 255.1 µmol/mL. The chromatographic evaluations (retention and capacity) of this gel are shown in table 2.

Level 2:

The solution resulting from the filtration directly after the coupling to the matrix at 411 µmol/mL was reacting with an activated Sepharose® 6FF with an allyl loading of 250 µmol/mL. The coupling was made according to Step3. The generated gel 3a-2 present an ionic capacity of 196.0 µmol/mL. The chromatographic evaluations (retention and capacity) of this gel are shown in table 2.

Level 3:

The solution resulting from the filtration directly after the coupling to the matrix at 250 µmol/mL was reacting with an activated Sepharose® 6FF with an allyl loading of 138 µmol/mL. The coupling was made according to Step3. The generated gel 3a-3 present an ionic capacity of 117.4 µmol/mL. The chromatographic evaluations (retention and capacity) of this gel are shown in table 2.

Example 10

Level 1:

The solution B was prepared with 1.24 g (10.3 mmol) of isovaleryl chloride in 4 mL DCM and according Step 1a (general procedures), added to solution A. Following Step 2 the solvent was removed and 6 mL of a solution of sodium hydroxide 5N was added to the crude material. According to Step 3, 5 mL of brominated Sepharose® 4FF with an allyl loading of 580 µmol/mL of gel was added to the mixture. The ionic capacity of the gel 1j-4 was 108.4 µmol/mL. The chromatographic evaluations (retention and capacity) of this gel are shown in table 2.

Level 2:

The solution resulting from the filtration directly after the coupling to the matrix at 580 µmol/mL was reacting with an activated Sepharose® 4FF with an allyl loading of 240 µmol/mL. The coupling was made according to Step 3. The generated gel 1j-5 present an ionic capacity of 128.1 µmol/mL. The chromatographic evaluations (retention and capacity) of this gel are shown in table 2.

Example 11

Level 1:

The solution B was prepared with 2.33 g (10.3 mmol) of benzoic anhydride in 4 mL DCM and according Step 1a, added to solution A. Following Step 2 the solvent was removed and 6 mL of a solution of sodium hydroxide 5N was added to the crude material. According to Step 3, 5 mL of brominated Sepharose® 4FF with an allyl loading of 580 µmol/mL of gel was added to the mixture. The ionic capacity of the gel 3a-4 was 148.1 µmol/mL. The chromatographic evaluations (retention and capacity) of this gel are shown in table 2.

Level 2:

The solution resulting from the filtration directly after the coupling to the matrix at 580 µmol/mL was reacting with an activated Sepharose® 4FF with an allyl loading of 240 µmol/nL. The coupling was made according to Step3. The generated gel 3a-5 present an ionic capacity of 144.7 µmol/mL. The chromatographic evaluations (retention and capacity) of this gel are shown in table 2.

TABLE 2

[Structure: circle—O—CH2—CH(OH)—CH2—S—CH2—CH2—CH(COOH)—NH—V—R]

V = CO, SO2

| Structure of R—V | Code | Matrix | Ionic capacity (μmol/mL) | Retention Cyt C (mS/cm) | Capacity BSA (mg/mL) | IgG (mg/mL) |
|---|---|---|---|---|---|---|
| isobutyl ketone | 1j | 6FF | 232.4[a] | 34.4 | 43.8 | 25.7 |
| | 1j-2 | 6FF | 162.8[b] | 32.1 | 50.1 | 25.7 |
| | 1j-3 | 6FF | 104.2 | 30.5 | 48.7 | 24.6 |
| | 1j-4 | 4FF | 108. | 33.2 | 27.9 | 19.4 |
| | 1j-5 | 4FF | 128. | 33.8 | 46.6 | 24.0 |
| phenyl ketone | 3a | 6FF | 255.1[a] | 56.8 | 36.0 | 14.4 |
| | 3a-2 | 6FF | 196.0[b] | 48.5 | 48.8 | 24.9 |
| | 3a-3 | 6FF | 117.4 | 45.2 | 47.4 | 25.2 |
| | 3a-4 | 4FF | 148. | 46.5 | 30.1 | 24.7 |
| | 3a-5 | 4FF | 144. | 47.2 | 47.3 | 35.3 |

Examples 12–14

Experimental Reference Procedures for Ion Exchangers

Materials

Buffer Solutions
Buffer 1: 20 mM sodium phosphate, 0.3 M NaCl, pH 6.8
Buffer 2: 20 mM sodium acetate, 0.25 M NaCl, pH 4.0
Buffer 3: 20 mM sodium acetate, 0.25 M NaCl, pH 4.5
Buffer 4. 20 mM sodium phosphate, 2 M NaCl, pH 6.8
Buffer 5: 100 mM sodium phosphate, pH 7.0 (for elution of BSA and IgG)

Protein Solutions

| 1. BSA: | 4 mg/mL in Buffer 2 |
|---|---|
| 2. IgG:. | 4 mg/mL in Buffer 3 |

All buffers and protein solutions were filtered through a 0.45 μm Millipore Millex HA filters before use.

Chromatography System

All experiments were performed at room temperature using a ÄKTA Explorer 100 chromatography system (Amersham Pharmacia Biotech AB) equipped with a Unicorn 3.1 software. Samples were applied to the columns via a 150 mL superloop. A flow rate of 1 mL/min (ca. 300 cm/h) was used throughout. The effluents were monitored continuously by absorbance measurements at 280 nm using a 10 mm flow cell.

Example 12

Frontal Analysis "High Salt" Ligand

Each prototype cation exchanger was packed in a HR5/5 column (packed bed volume=1 mL) and equilibrated with a buffer of appropriate pH and salt concentration. The void volume of the system was determined by applying a solution of a suitable protein to the column under non-binding conditions. The time it takes for the $A_{280}$ of the effluent to reach 10% of the $A_{280}$ of the applied protein is taken as the void volume of the system (expressed in minutes).

To a column equilibrated with an appropriate buffer (Buffer 1, 2 or 3) was continuously fed (e.g. via a 150 mL super loop) the sample protein dissolved in the appropriate equilibration buffer (see above) at a flow rate of 1 mL/min (i.e. ca. 300 cm/h). The application of the sample was continued until the $A_{280}$ of the effluent reached a level of 10% of the $A_{280}$ the sample applied to the column. On the basis of data so obtained [i.e. volume of the packed gel bed (Vc), its void volume, flow rate and concentration of the protein fed to the column], the breakthrough capacity of the packed gel at a level of 10% of the concentration of the protein applied to it ($QB_{10\%}$) can be calculated.

Example 13

Breakthrough and Evaluation

The breakthrough at a level of 10% of the absorbance maximum ($Qb_{10\%}$) was calculated using the following relationship:

$$Qb_{10\%} = (T_{R10\%} - T_{RD}) \times C/V_c$$

where:

$T_{R10\%}$=retention time (min) at 10% of the absorbance maximum,
$T_{RD}$=void volume of the system (in min),
C=concentration of the feed protein (4 mg/mL) and,
$V_C$=packed bed volume (mL).of the column.

Example 14

Recovery of Proteins Bound to "High Salt" Cation-Exchange Ligands

"High salt" cation exchange ligands will preferably also be screened with respect to the recovery of proteins bound on them. This is an additional and important criterion for choosing the right kinds of ligands that combine relatively high adsorption capacities with high or quantitative recoveries of proteins applied to them.

What is claimed is:

1. A method of generating a separation medium including mixed mode cation-exchanger ligands coupled to a base matrix, which method comprises the steps of
   (a) providing at least one scaffold, said scaffold including a functional group (F) and having a cyclic core structure;
   (b) derivatizing each of the scaffold(s) with a reagent, which includes a reactive group (Z) coupled to a residue (R), by reacting the functional group of said scaffold with the reactive group of said reagent, while retaining the cyclic core structure of the scaffold;
   (c) opening up of the cyclic structure of the resulting derivative; and
   (d) reacting the opened product so obtained with a base matrix including a reactive group;
wherein said scaffold presents at least two functionalities, one of which is a sulphur-comprising group for coupling to the reactive group of the base matrix and one of which is a group that can be transformed into an ionic group, said functionalities being present on the cyclic structure in adjacent positions, and wherein in step (c), opening up is provided by breaking the bond between two functionalities.

2. The method of claim 1, wherein the scaffold has the structure

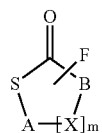
(I)

wherein A, B and X are independently carbon atoms or any heteroatoms, m is any integer between 0 and 4, and the functional group (F) is either coupled to any one of A, B and X.

3. The method of claim 2, wherein in formula (I), the functional group (F) is selected from the group consisting of leaving groups C—Y, wherein Y is Br, Cl, I, mesylate, or a tosylate; acids; and activated acids.

4. The method of claim 2, wherein in formula (I), A, B, and X are carbon atoms, m is 1 and F is —NH$_2$.

5. The method of claim 2, wherein the scaffold is homocysteine thiolactone:

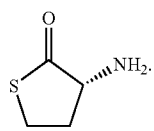

6. The method of claim 1, wherein the derivatization agent used in step (b) is of the formula

-Z-R— (II)

wherein
   Z is a group which is capable of reacting with the functional group (F) of the scaffold; and
   R is a linear, branched, cyclic saturated, unsaturated and aromatic hydrocarbon group.

7. The method of claim 1, further comprising a step of brominating, separately and before step (b), the reactive group of the base matrix, wherein said reactive group is a carbon-carbon double bond.

8. A method of generating a separation medium comprising mixed mode cation-exchanger ligands coupled to a base matrix, comprising
   (a) providing at least one scaffold derivative having a cyclic structure;
   (b) opening up of the cyclic structure of the derivative; and
   (c) reacting the opened product so obtained with a base matrix including a reactive group;
wherein said scaffold derivative is of formula (III)

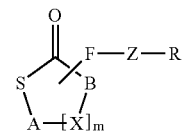
(III)

wherein A, B and X are independently carbon atoms or any heteroatoms, and m is any integer between 0 and 4, and further wherein said functionalities are on the cyclic structure in adjacent positions, and wherein in step (c), opening up is provided by breaking the bond between said two adjacent positions, and wherein a F-Z-R is coupled to any one of A, B and X and wherein F is a functional group, Z is reactive group, and R is residue.

9. The method of claim 8, wherein R is a linear, branched, cyclic, saturated, unsaturated or aromatic hydrocarbon group.

10. The method of claim 8, wherein the scaffold derivative is a homocysteine thiolactone derivative.

11. The method of claim 8, further comprising a step of activating, separately and before step (b), the reactive group of the base matrix under conditions favouring radical reaction, wherein said reactive group is a carbon-carbon double bond.

* * * * *